(12) United States Patent
Minkin et al.

(10) Patent No.: US 8,335,892 B1
(45) Date of Patent: Dec. 18, 2012

(54) CACHE ARBITRATION BETWEEN MULTIPLE CLIENTS

(75) Inventors: Alexander L. Minkin, Los Altos, CA (US); Steven J. Heinrich, Madison, AL (US); Rajeshwaran Selvanesan, Milpitas, CA (US); Charles McCarver, Madison, AL (US); Stewart Glenn Carlton, Madison, AL (US); Anjana Rajendran, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 332 days.

(21) Appl. No.: 12/650,226

(22) Filed: Dec. 30, 2009

Related U.S. Application Data

(60) Provisional application No. 61/246,369, filed on Sep. 28, 2009.

(51) Int. Cl.
G06F 12/00 (2006.01)
G06F 13/00 (2006.01)
G06F 13/28 (2006.01)

(52) U.S. Cl. . 711/118; 711/150; 711/167; 711/E12.049; 710/6; 710/60

(58) Field of Classification Search ............... 711/118, 711/150, 167, E12.049; 710/6, 60
See application file for complete search history.

(56) References Cited

U.S. PATENT DOCUMENTS

| | | | |
|---|---|---|---|
| 5,905,509 A * | 5/1999 | Jones et al. | 345/520 |
| 2001/0039604 A1* | 11/2001 | Takahashi | 711/141 |
| 2003/0097531 A1* | 5/2003 | Arimilli et al. | 711/146 |
| 2004/0148484 A1* | 7/2004 | Watanabe et al. | 711/170 |
| 2007/0081516 A1* | 4/2007 | Arimilli et al. | 370/351 |
| 2008/0155196 A1* | 6/2008 | Black et al. | 711/119 |
| 2009/0049287 A1* | 2/2009 | Chung | 712/244 |

FOREIGN PATENT DOCUMENTS

| | | |
|---|---|---|
| WO | 2008127610 | 10/2008 |
| WO | 2008127622 | 10/2008 |
| WO | 2008127623 | 10/2008 |

* cited by examiner

*Primary Examiner* — Edward Dudek, Jr.
(74) *Attorney, Agent, or Firm* — Patterson & Sheridan, LLP

(57) ABSTRACT

One embodiment of the present invention sets forth a technique for arbitrating requests received by an L1 cache from multiple clients. The L1 cache outputs bubble requests to a first one of the multiple clients that cause the first one of the multiple clients to insert bubbles into the request stream, where a bubble is the absence of a request. The bubbles allow the L1 cache to grant access to another one of the multiple clients without stalling the first one of the multiple clients. The L1 cache services multiple clients with diverse latency and bandwidth requirements and may be reconfigured to provide memory spaces for clients executing multiple parallel threads, where the memory spaces each have a different scope.

20 Claims, 10 Drawing Sheets

CACHE ARBITRATION BETWEEN MULTIPLE CLIENTS

CROSS-REFERENCE TO RELATED APPLICATIONS

This application claims priority benefit to U.S. provisional patent application titled, "Cache Arbitration Between Multiple Clients," filed on Sep. 28, 2009 and having Ser. No. 61/246,369.

BACKGROUND OF THE INVENTION

1. Field of the Invention

The present invention generally relates to data storage and more specifically to arbitrating requests received by a level-one (L1) cache from multiple clients.

2. Description of the Related Art

Performance requirements are constantly increasing in data processing systems. Multiple processing units may be configured to operate in parallel by the execution of multiple parallel threads. For some applications the multiple parallel threads execute independently. For other applications, the multiple parallel threads share some data. For example, a first thread may compute an input that is used by one or more other threads. Finally, the threads may be organized in groups, where data is shared within each group, but not between groups.

Multithreaded parallel programs written using a programming model such as the CUDA™ C (general purpose parallel computing instruction set architecture) and PTX™ (a low-level parallel thread execution virtual machine and virtual instruction set architecture) provided by NVIDIA® access two or more distinct memory address spaces each having a different parallel scope, e.g., per-thread private local memory, per-group shared memory, and per-application global memory. The private local memory is implemented as a dedicated local storage and the per-group shared memory is implemented as a SRAM memory that may be accessed by all of the threads in a group. The global memory includes off-chip memory that may be cached.

Accordingly, what is needed in the art is a technique that reduces the dedicated storage used to provide the memory spaces that have each have a different scope.

SUMMARY OF THE INVENTION

One embodiment of the present invention sets forth a technique for providing a L1 cache that is a central storage resource for multiple clients with diverse latency and bandwidth requirements. Conventional data caches are accessed only be a single client and therefore do not require arbitration schemes. The L1 cache arbitrates between the different clients when more than one request is received in the same clock cycle. The arbitration policy may be programmed and the L1 cache may also be reconfigured to create multiple storage spaces. One advantage is that the shared L1 cache may replace dedicated buffers, caches, and FIFOs in previous architectures.

Various embodiments of a method of the invention for arbitrating requests received by a level-one (L1) cache from multiple clients that share the L1 cache include receiving a first request from a first client of the L1 cache in a first clock cycle and receiving a second request from a second client of the L1 cache in the first clock cycle. A bubble count that is output to the first client is incremented, indicating that an absence of a request from the first client is needed for one clock cycle. A bubble request timeout counter is initialized and the first request from the first client is granted.

Various embodiments of the invention include a system for arbitrating between multiple clients that share a level-one (L1) cache and multiple clients. The system includes the multiple clients that are coupled to the L1 cache and the L1 cache. The L1 cache is configured to receive a first request from a first client of the L1 cache in a first clock cycle and receive a second request from a second client of the L1 cache in the first clock cycle. A bubble count that is output to the first client is incremented, indicating that an absence of a request from the first client is needed for one clock cycle. A bubble request timeout counter is initialized and the first request from the first client is granted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
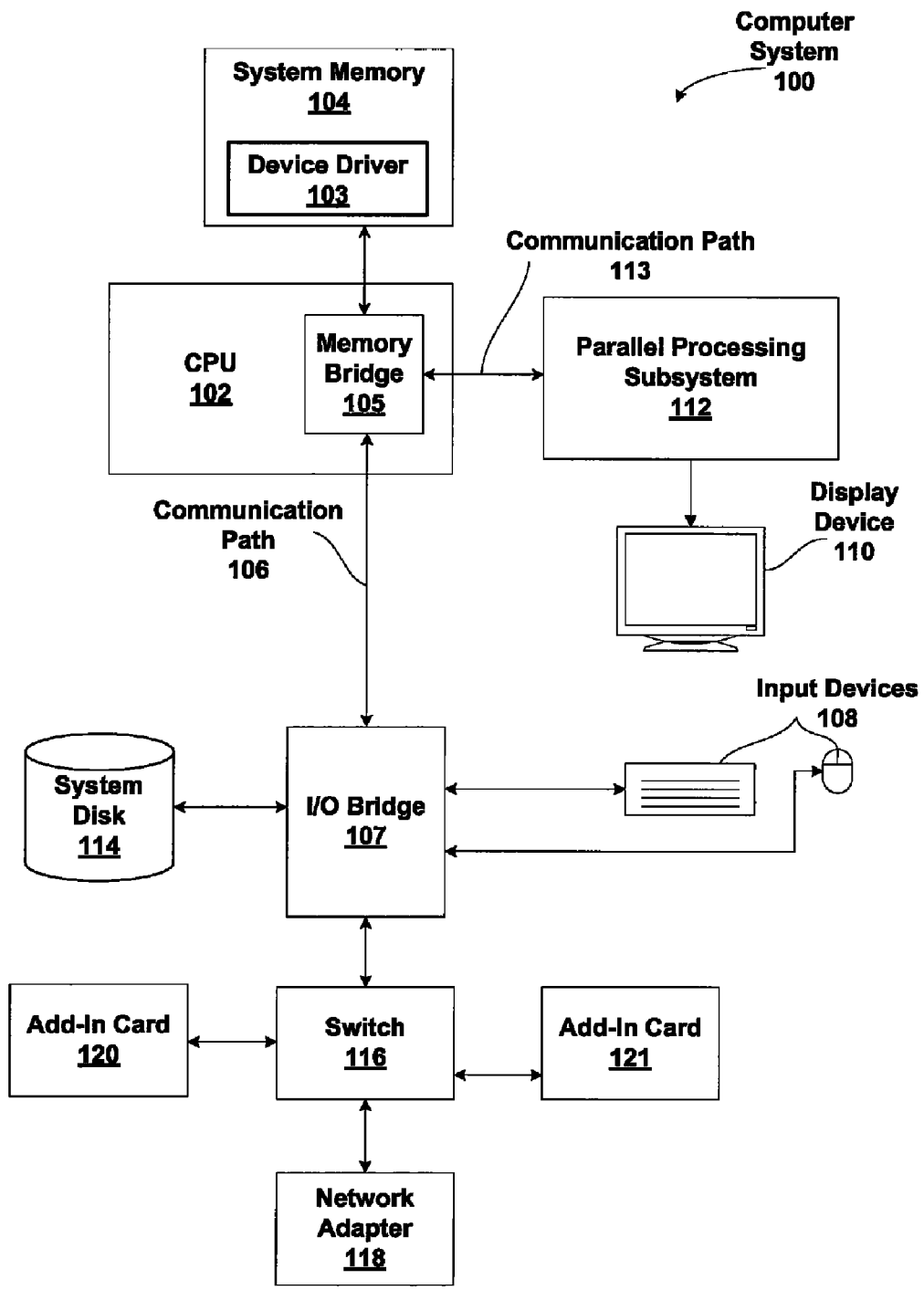
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
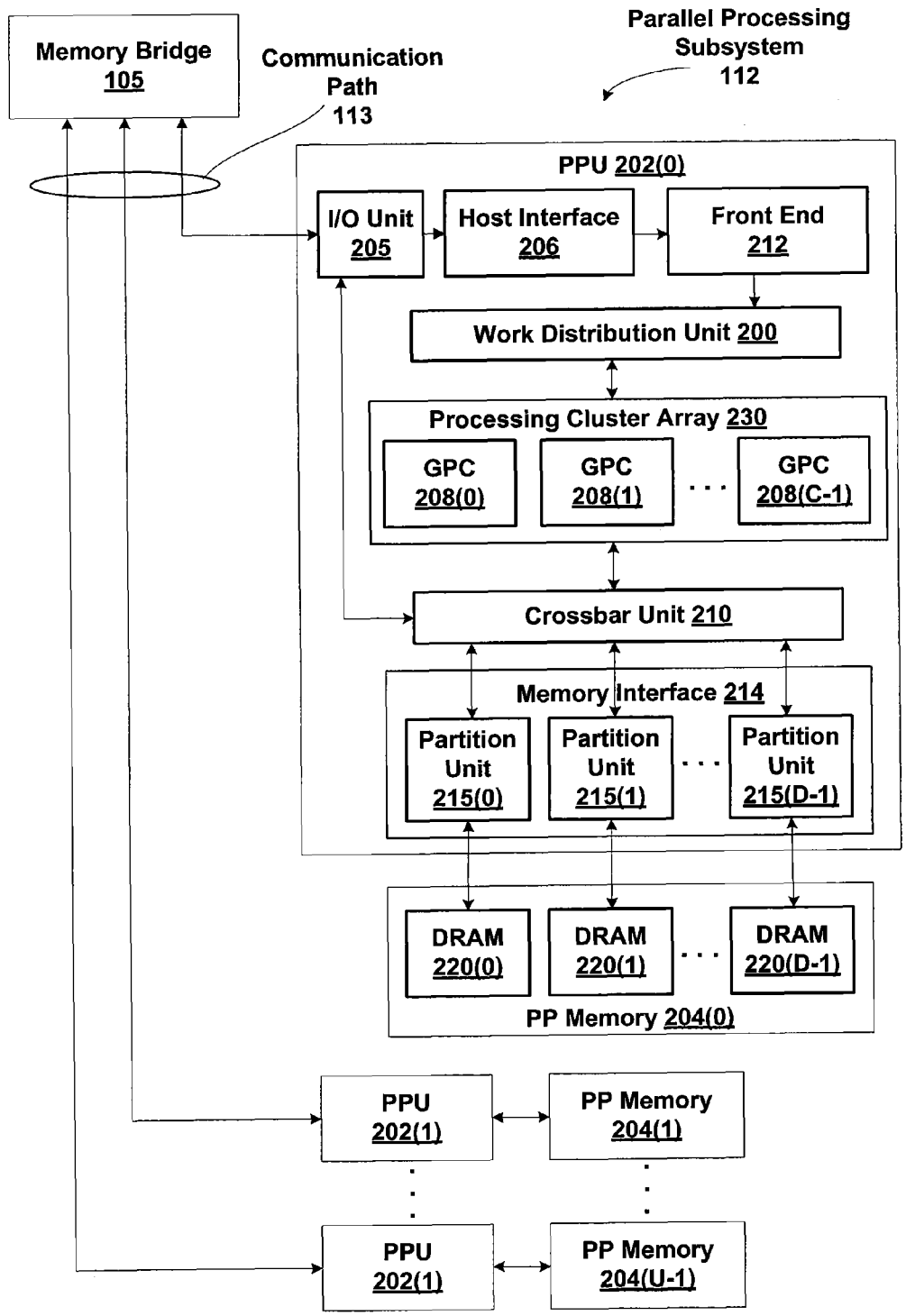
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where $D \geq 1$. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
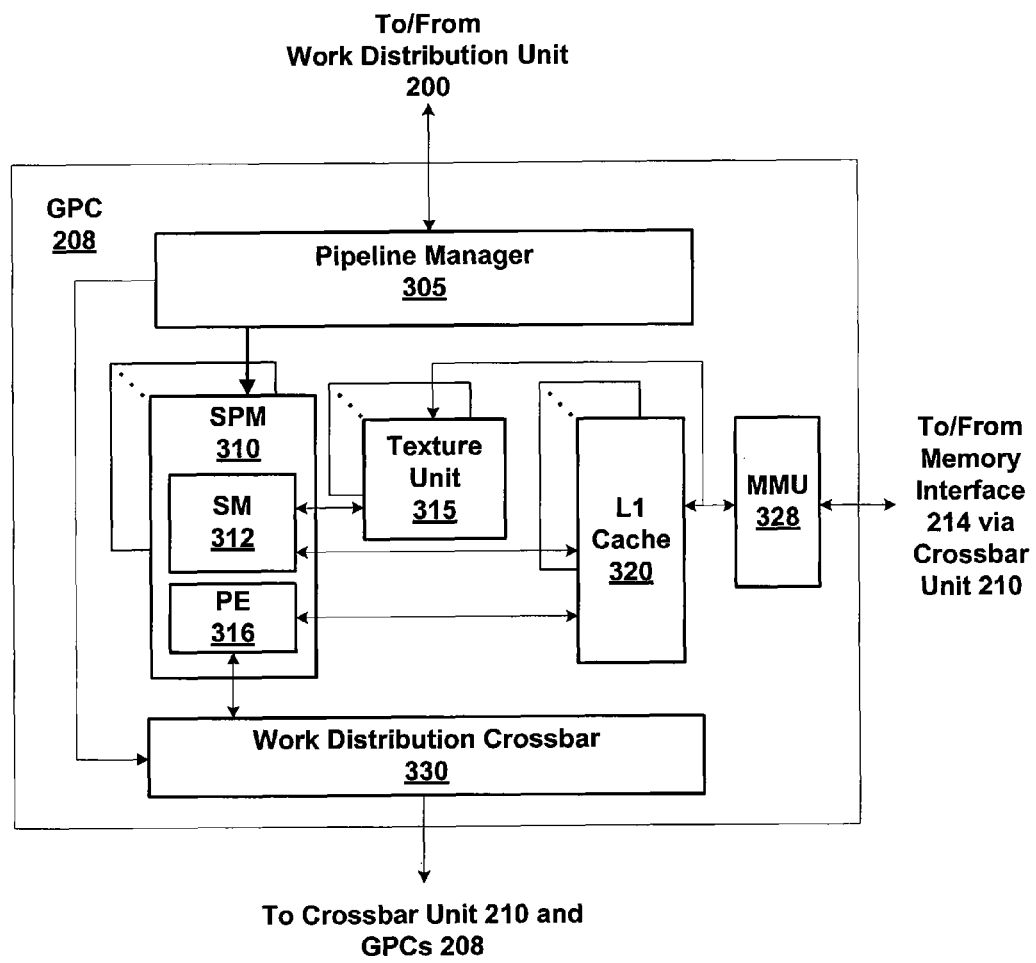
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In one embodiment, each GPC 208 includes a number M of SPMs 310, where M≧1, each SPM 310 configured to process one or more thread groups. Also, each SPM 310 advantageously includes an identical set of functional execution units (e.g., arithmetic logic units, load-store units, etc.) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

More specifically, each SPM 310 includes a primitive engine (PE) 316 and a parallel streaming multiprocessor (SM) 312. In graphics applications, the PE 316 is configured to perform screen space graphics processing functions that may include, but are not limited to primitive setup, rasterization, and z culling. In some embodiments, the PE 316 is configured to gather pixels into tiles of multiple neighboring pixels before outputting the pixels to L1 cache 320 in order to improve the access efficiency of L1 cache 320. The PE 316 receives a processing task from work distribution unit 200, and when the processing task does not require the operations performed by the PE 316, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

The series of instructions transmitted to a particular GPC 208 constitutes a thread, as previously defined herein, and the collection of a certain number of concurrently executing threads across the SMs 312 within an SPM 310 is referred to herein as a "warp" or "thread group." As used herein, a "thread group" refers to a group of threads concurrently executing the same program on different input data, with one thread of the group being assigned to a different SM 312 within an SPM 310. A thread group may include fewer threads than the number of SMs 312 within the SPM 310, in which case some SMs 312 will be idle during cycles when that thread group is being processed. A thread group may also include more threads than the number of SMs 312 within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of SMs 312 within the SPM 310, and m is the number of thread groups simultaneously active within the SPM 310. The size of a CTA is generally determined by the programmer and the amount of hardware resources, such as memory or registers, available to the CTA. While there may be a plurality of thread groups in different phases of execution within a CTA running on an SPM, there may also be different CTAs in different phases of execution simultaneously running on the same SPM 310. The value for m may be fewer (or not) than the total number of thread groups supported in total on an SPM 310. Then the total number of thread groups that may be simultaneously active within the SPM 310 is m*k*c, where c is the total number of CTAs supported on an SPM 310.

Each SPM 310 uses space in a corresponding L1 cache 320 that is used to perform load and store operations. In some embodiments, the L1 cache 320 is included within the SPM 310. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or L1 cache 320 or GPC 208. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from L1 cache 320, and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210.

It will be appreciated that the core architecture described herein is illustrative and that variations and modifications are possible. Any number of processing engines, e.g., PEs 316, SMs 312, SPMs 310, or texture units 315 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, MMUs 328, and so on.

Persons skilled in the art will understand that the architecture described in FIGS. 1, 2, and 3A in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing from the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

GPC 208 provides on-chip (internal) data storage with different levels of accessibility. Special registers (not shown) are readable but not writeable by processing engines and are used to store parameters defining each CTA thread's "position." In one embodiment, special registers include one register per CTA thread (or per SPM 310) that stores a thread ID; each thread ID register is accessible only by a respective one of the SPMs 310. Special registers may also include additional registers, readable by all CTA threads (or by all processing engines) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any processing engine). In one embodiment, device driver 103 provides parameters to the parameter memory before directing SPM 310 to begin execution of a CTA that uses these parameters. Any CTA thread within any CTA (or any PE 216 or SM 312 within an SPM 310) can access global memory through a memory interface 214. Portions of global memory may be stored in the L1 cache 320.

Each CTA thread may load and store data in "local registers" that are used as scratch space; each register is allocated for the exclusive use of one CTA thread (or one processing engine), and data in any the local registers is accessible only to the CTA thread to which it is allocated. Conventionally, the local registers are implemented as a separate register file. L1 cache 320 is designed to load and store data to perform the function previously performed by the separate local register file. L1 cache 320 performs the local register load and store operations by physically or logically dividing the L1 cache 320 into P lanes, each having some number of entries (where each entry might store, e.g., a 32-bit word). One lane is assigned to each of the P SMs 312, and corresponding entries in different lanes can be populated with data for different threads executing the same program to facilitate SIMD execution. Different portions of the lanes can be allocated to different ones of the G concurrent thread groups, so that a given entry in the L1 cache 320 is accessible only to a particular thread. In one embodiment, certain entries within the L1 cache 320 are reserved for storing thread identifiers, implementing one of the special registers. For some operations (e.g., vector operations, specialized compare-and-swap atomic memory operations), multiple lanes may be assigned to each of the P SMs 312, where fewer than P SMs 312 use the L1 cache 320 at a time, and the overall operations for all P SMs 312 is serialized over multiple cycles.

CTA threads (within a single CTA) may also load and store data in "shared memory" including locations that are accessible to any CTA thread within the same CTA (or to any processing engine within SPM 310). L1 cache 320 is also designed to load and store data in shared memory allowing any PE 316 or SM 212 to read from or write to any location in the shared memory. In some embodiments, shared state space maps onto a per-CTA region of off-chip memory. The parameter memory can be implemented as a designated section within L1 cache 320, or as a separate shared register file or on-chip cache memory to which the SMs 312 and PEs 316 have read-only access. In one embodiment, the area that implements the parameter memory is also used to store the CTA ID and grid ID, as well as CTA and grid dimensions, implementing portions of the special registers. Finally, any thread may load and store data in a global memory.

Figure 3B:
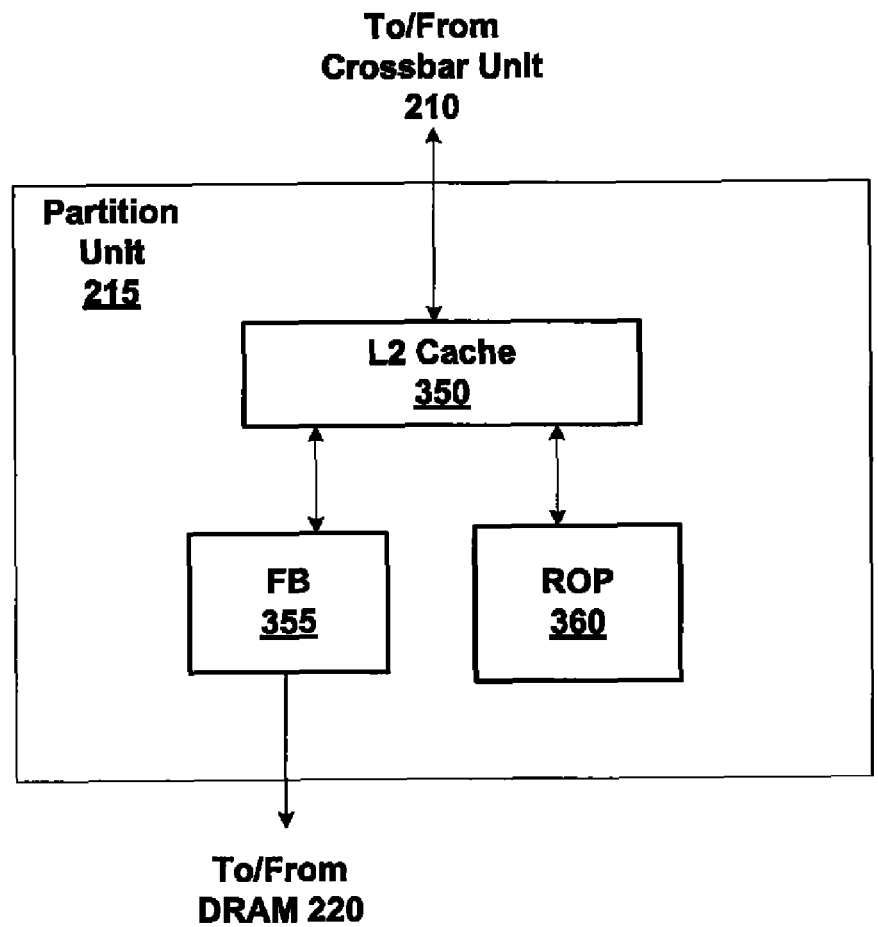
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates of cache lines that have been written are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing from the scope of the present invention.

Graphics Pipeline Architecture

Figure 4:
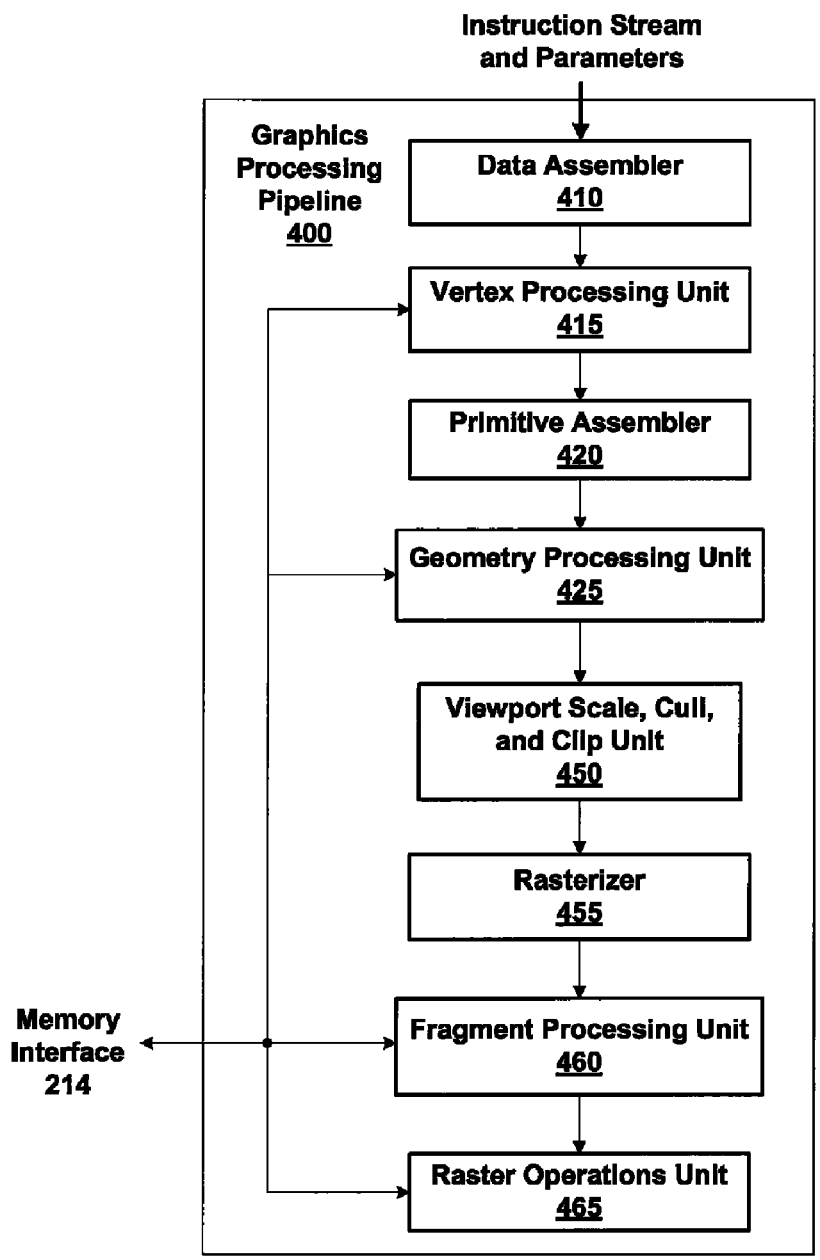
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Configurable L1 Cache

Figure 5A:
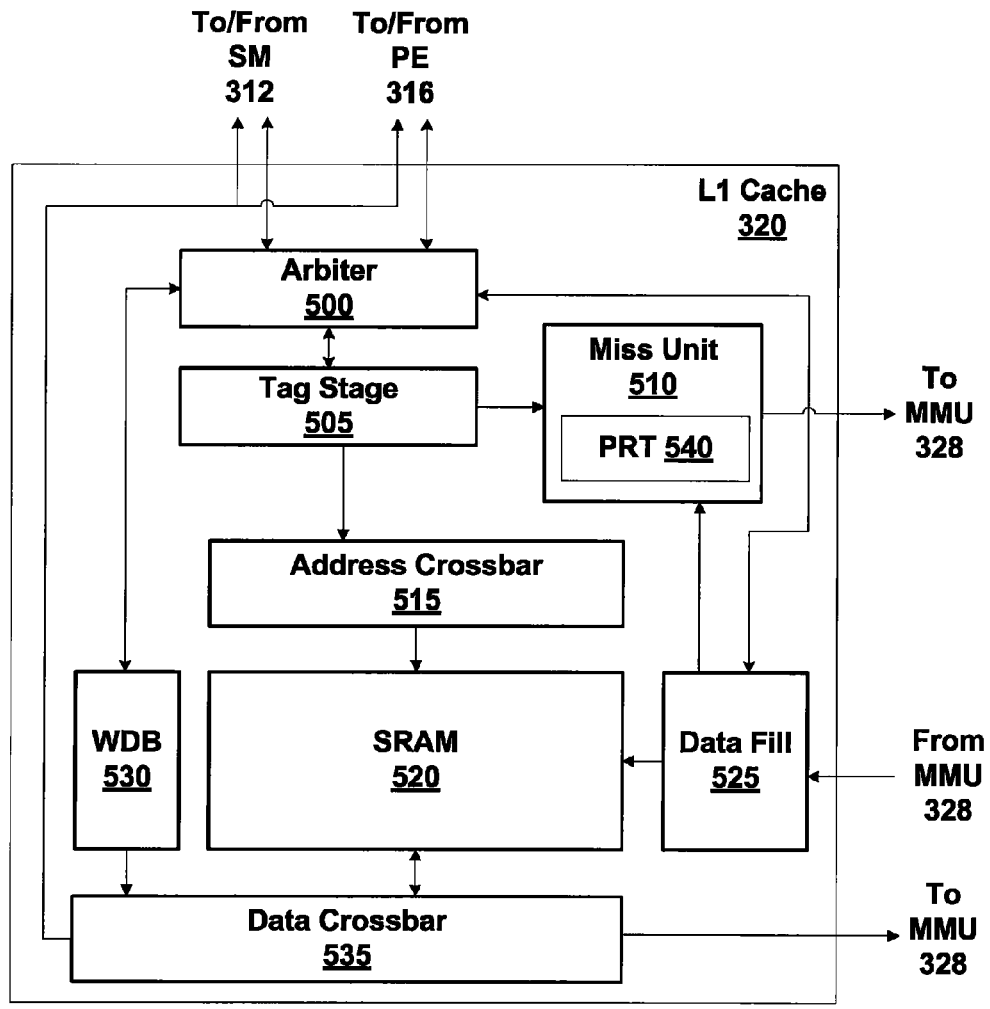
FIG. 5A is a block diagram of a portion of the L1 cache of FIG. 3A, according to one embodiment of the present invention.

FIG. 5A is a block diagram of a portion of the L1 cache 320 of FIG. 3A, according to one embodiment of the present invention. The L1 Cache 320 is a central storage resource that replaces dedicated memory storage, e.g., buffers, caches, and FIFOs in previous architectures that provide memory spaces with different scopes. As such, the L1 Cache 320 is responsible for servicing multiple clients, e.g., PE 316 and SM 312, having diverse latency and bandwidth requirements. To satisfy these requirements, the L1 Cache 320 supports reconfiguration among multiple storage spaces, namely a direct mapped storage region and local and global cache region. The direct mapped storage region replaces dedicated buffers, FIFOs, and interface paths in conventional architectures to implement the shared memory functions. The direct mapped storage region may be used to exchange attribute and primitive data among client units for graphics processing (SM 316, PE 312) to implement the local register functions, and the direct mapped storage can be used as a global register file for compute processing to implement the global memory functions. The local and global cache region supports load/store memory requests to multiple spaces. These spaces include global, local, and call-return stack (CRS) memory.

Request processing for the direct mapped storage region and the local and global cache region may occur independently. For example, direct mapped storage region requests may still be serviced without interrupts caused by local and global cache region misses, flushes, invalidates, cache control operations, and memory barrier operations. The direct mapped storage region requests may still be serviced if resources needed for local and global cache region are in use or otherwise blocked (e.g., WDB 530, internal FIFOs, external interfaces to MMU 328), provided the direct mapped storage region resources are available (data crossbar 535, data read or write port of SRAM 520).

The L1 cache 320 includes an arbiter 500, a tag stage 505, a miss unit 510, a data fill 525, an address crossbar 515, a (write data buffer) WDB 530, an SRAM 520, and a data crossbar 535. L1 cache 320 receives load and store requests (for the direct mapped storage and the local and global cache storage) from the SMs 312 and the PEs 316. Even though direct mapped storage and local and global cache requests have different characteristics, common resources are scheduled to service them. Resources are scheduled (granted) at constant time slots relative to request arbitration.

In one embodiment, the arbiter 500 may receive smaller (data) width load and store requests from the PEs 316 compared with the load and store requests received from the SMs 312. The arbiter 500 gathers several requests from the PEs 316 to produce a larger width request before arbitrating between the request from the PE 316 and any requests from the SMs 312. Similarly in another embodiment, the arbiter 500 is configured to compensate for different data interface widths between SMs 312 and PE 316. For example, the arbiter 500 gathers enough data sent sequentially from the PE 316 for a single request to produce a larger width request before arbitrating between the request from the PE 316 and any requests from the SMs 312. The arbiter 500 also includes a conflict resolver (not shown) that identifies bank conflicts (multiple accesses to different locations within the same memory bank) and address collisions (multiple accesses to the same address).

The rules for how to resolve a conflict or collision vary according to request type. The conflict resolver is responsible for resolving bank and addressing conflicts to the SRAM 520. A conflict is normally defined as two addresses that are trying to access the same SRAM bank with different SRAM addresses (bank conflict), or a write request that is trying to write data to the same SRAM bank and address (read addresses to the same bank and same address are not a conflict). Requests with conflicts will be partially serviced and the conflicting part of the request will be deferred and processed after the conflict is no longer present. A defer mask will be forwarded on with the request, indicating a partial defer. Write conflicts are examined for overlapping byte enables. If no byte enables are overlapping, then there is no conflict and the write is merged. For some operations, writes with conflicts are resolved where one thread "wins" the location in conflict. An embodiment may do this in one pass or use the defer scheme to serialize in multiple passes.

In addition to avoiding conflicts, the arbiter 500 also schedules the requests based on constraints imposed by the SRAM 520, address crossbar 515, and data crossbar 535. The SRAM 520 may perform one read access and one write access per clock cycle. For optimal throughput, the arbiter 500 pairs a read access request with a write access request. The data crossbar 535 may only be used to rearrange data read from SRAM 520 or rearrange data being stored into either SRAM 520 or WDB 530 for one of the accesses in the single clock cycle. Similarly, the address crossbar 385 may only be used to rearrange the address for one of the accesses in the single clock cycle.

When presented with a request from an SM 312 to access the local and global cache region, the arbiter 500 follows some general rules, including not arbitrating a read request until the L1 cache 320 is able to receive and buffer the data and outputting an active mask with the request in order to avoid unecessary fetches when there is a cache miss. The active mask indicates the portion of the data that is requested by the SM 312. A valid mask may be provided by the SM 312 that is used to kill invalid writes and return zeros for invalid reads. When presented with a request from an SM 312 or PE 316 to access the direct mapped storage region, the arbiter 500 follows some general rules, including not arbitrating a store request until the request and data to be stored are present and not arbitrating a (load) read request until the L1 cache 320 is able to receive and buffer the data.

The arbiter 500 may be configured to support address wrapping for accesses to the direct mapped storage. This advantageously prevents errors from being generated when an out-of-bounds address is received. Addresses for the direct mapped storage requests automatically wrap modulo the direct mapped storage size, assuming that the direct mapped storage allocation begins at address 0.

The arbiter 500 outputs requests to access the local and global cache storage to the tag stage 505. The tag stage 505 determines whether or not a request to access the local and global cache storage can be processed based on the data present in the SRAM 520. The tag stage 505 also determines whether or not a store request includes all of the data stored in a cache line, or if some data needs to be read from memory in order to perform the store request. When tag stage 505 determines that data needs to be read from memory to complete the (load or store) request, a cache miss occurs and tag state 355 outputs a miss request to the miss unit 510. The miss unit 510 outputs miss requests to MMU 328 to be fulfilled. The miss unit 510 includes a PRT (pending request table) 540 that is used to track pending requests and retire those requests as the data needed to fulfill the requests is received via MMU 328.

The data fill 525 receives the miss data from MMU 328 and outputs a request for arbitration to access the SRAM 520 to arbiter 500. When the request to access the SRAM 520 is granted by the arbiter 500, the data fill 525 stores the miss data into the SRAM 520. The storing operation to complete a store request does not require processing by either of the address crossbar 515 or the data crossbar 535. The loading operating to complete a load request may require processing by either of the address crossbar 515 or the data crossbar 535. The data fill 525 also signals miss unit 510 when data is received from MMU 328 in order to retire miss requests that are tracked by the miss unit 510. The miss unit 510 may then signal to the SM 312 that the store or load request that caused the miss may be presented to the arbiter 500 again. In some embodiments, writing miss data is the highest priority source for writing the SRAM 520 so as to minimize blocking the crossbar 210. While the SRAM 520 may support a 128 byte write, in some embodiments, only 32 bytes may be returned per transfer from the MMU 328. To increase the bandwidth efficiency of writing the miss data, a 128 byte coalescing buffer may be included in the data fill 525 to collect the miss data into larger write accesses for the SRAM 520.

Data received with a store request for an entry in global memory may be uncached and are therefore output by arbiter 500 to the WDB 530 to bypass the SRAM 520. Alternatively, the data received for a global memory store request may be stored in an entry of SRAM 520 or global store requests may be processed as cached requests. The data may remain stored in the entry of the SRAM 520 until the data is output to the global memory and then the entry storing the data may be invalidated. The data received with the store request is output via the data crossbar 535 when the arbiter 500 schedules the store request. Read (load) requests for global registers may be cached in the local and global cache storage that is allocated with the SRAM 520. However, data requested for a global memory load request may be configured to bypass the SRAM 520 when global memory entries are uncached. Again, uncached requests are applicable to both local and global. Alternatively, the data requested for a global memory load request may be stored in an entry of SRAM 520 after being received by data fill 379. The data may remain stored in the entry of the SRAM 520 until the data is output to the requesting client and then the entry storing the data may be invalidated. SRAM 520 is advatageously used to buffer data read from global memory before the client receives the data from the L1 cache 320. Similarly, local load and store requests may be cached or uncached for different embodiments.

The address crossbar 515 is used to process both read and write requests. The address crossbar 515 routes the addresses and byte enables to the correct bank of SRAM 520. Each lane received by the address crossbar 515 from the arbiter 500 will have an associated bank. These bank bits become the address selects used to steer the addresses to the appropriate bank of SRAM 520. In one embodiment, each of 32 output lanes contains a 32 to 1 multiplexer to perform the routing operation. The address crossbar 515 routes the address provided with the request in portions to rearrange the address before outputting the address to the SRAM 520.

The data crossbar 535 may be a single 32×32 channel data crossbar with 32-bits per channel for routing data into and out of the SRAM 520, i.e., that is shared by accesses for both reads and writes. The data crossbar 535 is scheduled for direct mapped storage accesses and local and global cache accesses. The data crossbar 535 may be segmented into four 32×32 byte wide data cross-bars. Each data lane may be 8 bits wide and have 32 sources. The write data is provided by the clients (SM 312 and PE 316) and routing information is provided by the PRT 540 for backfills, miss grants or from the clients to provide the correct data routing for all lanes. Byte enables may be routed through the address crossbar 515 for all writes. Only active and valid requests will be stored, and the active and valid masks may be reduced to one mask before reaching the data crossbar 535. The data crossbar 535 routes the data provided with write requests in portions to rearrange the data before outputting the data to the SRAM 520. The data crossbar 535 also routes the data output by the SRAM 520 for read requests in portions to rearrange the data before outputting the data to the requesting PE 316 or SM 312.

Read data selects and write data selects are formed in the SRAM 520. Read data selects are equivalent to the initial bank selects arriving with each lane from the client request. The SRAM 520 receives only bank selects for each 32 bit lane and forms write data selects by examining the byte enables as well as the banks specified for each lane. Multiple writes may collapse from different incoming lanes onto one bank of SRAM 520 provided their byte enables are non-overlapping. Write data selects specify the incoming lane provided for the destination byte. In some embodiments, due to the data width differences between the PE 316 and the SM 312, the data crossbar 535 within L1 cache 320 returns data in one transfer to the SMs 312 and returns data in a sequence of transfers to the PEs 316. The use of SRAM 520 and data crossbar 535 may be optimized so that each are only used by either a read or write operation and subsequent activity is not blocked while data returned to the PEs 316 is sequenced from temporary storage (not shown).

The SRAM 520 is a highly banked memory storage with 32 independently addressable memory banks. The direct mapped storage requests resolve to an independent address per bank, and the local and global cache requests resolve to the same address across all banks of the SRAM 520. The SRAM 520 receives normal cached accesses from either the address crossbar 515 or from the tag stage 505. These requests may be either reads or writes. Other ports allow for receiving miss data arriving from memory via MMU 328 and flushes to memory.

In some embodiments, the SRAM 520 includes support for error code correction (ECC) processing. L1 cache 320 may support single bit correct and double bit error detection. All data that is read from the SRAM 520 may be corrected before being returned to the client or flushed to the MMU 328. An ECC scrubber may also be included in the SRAM 520 as well. The ECC scrubber will be triggered by a register, and will initialize all of the SRAM data and ECC bits. All valid data should be flushed and invalidated prior to launching the scrubber.

SM/L1 Cache Interface Protocol

The interface between the SM 312 and the L1 cache 320 interface is non-stallable, meaning the L1 cache 320 cannot stall requests received from the SM 312. Similarly, requests from the data fill 525 may also be non-stallable. Requests received from other clients, such as those received from the PE 316 may be stalled. The request interface from SM 312 to the L1 cache 320 is unified in the sense that there is only one logical request wave front that is shared for both requests to access the direct mapped storage region and the local and global cache region. In some embodiments, multiple physical interfaces may be used to transmit requests from the SM 312 at delayed, but fixed latencies with respect to each other. This allows for an overlap in processing between SM 312 and L1 cache 320 and reduces overall latency. In general, any request or portion of a request from an SM 312 may be deferred by the L1 cache 320, and the SM 312 is responsible for later re-issuing that request. Typically SM 312 keeps track of the deferred requests and re-issues them later. An exception to this deferral technique is the miss grant request. SM 312 issues this request in response to receiving a miss data return request from the L1 cache 320. While the L1 cache 320 may defer a miss grant request, the L1 cache 320 tracks that the miss data return request needs to be re-issued. In other embodiments, the L1 cache 320 is configured to track the deferred requests and also re-issue those requests without issuing a miss data return request to the SM 312.

Figure 5B:
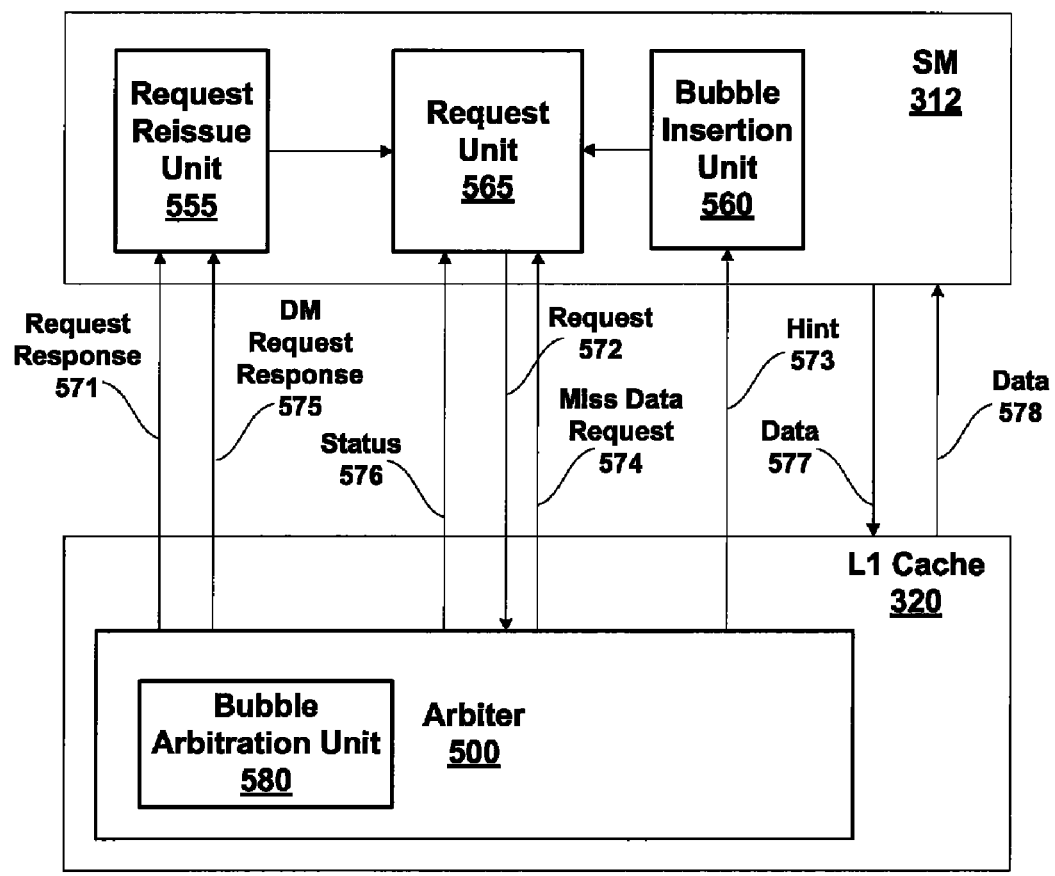
FIG. 5B is a block diagram of portions of the L1 cache and SM of FIG. 3A, according to one embodiment of the present invention.

FIG. 5B is a block diagram of portions of the L1 cache 320 and SM 312 of FIG. 3A, according to one embodiment of the present invention. The SM 312 includes a request unit 565, a request reissue unit 555, and a bubble insertion unit 560. The L1 cache 320 relies on the ability of the SM 312 to re-issue requests. For each request received from the request unit 565 within the SM 312 via the request interface 572, the L1 cache 320 returns an initial status on the request response interface 571. The status indicates cache hit or miss, shows what if any part of the request is deferred, and gives the reason for deferral if needed. Cache hits are serviced in a known time, while cache misses are serviced at some indeterminate time due to the latency of requests processed through the MMU 328. The request reissue unit 555 tracks the requests that are deferred and initiates reissuing of deferred requests.

In order to allow the L1 cache 320 to service the other clients, the L1 cache 320 outputs hint information to the SM 312 via the hint interface 573, including bubble counts. A bubble arbitration unit 580 within the arbiter 500 increments a count for a specific type of bubble. Examples of the different types of bubbles that are counted include a read bubble (i.e., absence of a read request), a write bubble (i.e., absence of a write request), or a complete bubble (i.e., absence of a read request and a write request). These counts are passed to the SM 312 via the hint interface 573. The bubble arbitration unit 580 interprets the lack of a request of a certain type or lack of any request from the SM 312 as a bubble. The bubble arbitration unit 580 decrements the count for a bubble type once that type is both received from the SM 312 and successfully used by another client.

The SM 312 inserts bubbles in the request stream output by the SM 312 to the L1 cache 320. The SM 312 has a scoreboard of requests that are in-flight and takes that information into account when determining whether or not to insert a bubble. The SM 312 avoids unnecessarily inserting bubbles since the bubbles reduce the number of requests that may be output from the SM 312. Delays in request processing due to arbitration between the SM 312 and other clients are minimized by inserting bubbles in the request stream and latency through the L1 cache 320 is thereby reduced. The L1 cache 320 keeps track of bubbles of the different types in order to allow different request types to be processed during the same clock cycle. For example, when a write bubble is received from the SM 312, miss data may be written to the SRAM 520 while an SM 312 read request is processed at the same clock. Therefore, the SM 312 can output a read request and the L1 cache 320 can service the read request and backfill to store the miss data.

The L1 cache 320 may defer any or all lanes of a request received from the SM 312. When the L1 cache 320 defers a request, all applicable reasons why the request was deferred are returned to the SM 312 in the initial status via the request response interface 571. The general reasons for deferral include resource and bank conflicts and/or resource limits. A request may be deferred as "come again", meaning automatically reschedule the request, or "back off", meaning wait for changes on the hints interface 573 to indicate all blocking conditions have been removed. When a request is deferred by the L1 cache 320, a defer mask, indicating the portions of the request that are deferred is output by the L1 cache 320 to the SM 312 via the request response interface 571 or DM request response 575. Note that requests that are not deferred (are accepted) have not necessarily been performed by the L1 cache 320. The request information has been accepted by the L1 cache 320 and possibly stored for later execution. Additionally, responses for requests that access the direct mapped memory may be returned to the SM 312 via the DM request response 575 instead of the request response 571.

The reasons why a request may be deferred as "come again" include memory bank conflicts, serialization of atomic memory operations to the same address, or if the SM 312 request had to be stomped (ignored) due to a more critical condition detected by the L1 cache 320. More critical conditions include PE 316 request starvation or the danger of overrun in data fill 525. The defer but "back off" reasons may indicate that all cache ways within the set in tag stage 505 that the request may map to are busy, internal FIFOs or resources such as the PRT 540 or WDB 530 are full, a memory barrier operation is pending, or the path to the MMU 328 is full. SM 312 requests deferred with "come again" may be automatically rescheduled by the L1 cache 320. Requests deferred with "back off" may send the specific reasons and/or resources for the deferral over request response interface 571 or DM request response 575. An embodiment may specify the set in tag stage 505 that needs to have a vacancy or idle entry, which an entry in PRT 540 needs further action, and which resources require a change in their status. As actions are taken by tag stage 505, the resources in PRT 540 free up, and memory barrier operations are performed, the L1 cache 320 sends updates of the hint information via hints interface 573. The SM request reissue unit 555 then knows when blocking conditions are removed and wakes up the previously deferred request for replay again. An embodiment may choose to limit or increase the extent to which defer reasons are reported and blocking conditions are updated in making performance and area tradeoffs.

Shared requests received from the SM 312 to access the shared direct mapped memory portion of the SRAM 520 are not cached by the L1 cache 320. The status of request conflicts as determined by the arbiter 500 is the limiting factor in determining if a request to access the direct mapped memory can be accepted by the L1 cache 320 rather than the hit/miss status. In order to reduce the response latency for accesses to the shared direct mapped memory portion of the SRAM 520, the DM request response interface 575 may provide an earlier response for loads and $\geq 32$ bit stores to the direct mapped memory. For these cases, no response is sent over the request response interface 571. However for <32 bit stores to the direct mapped memory, the response from the L1 cache 320 to the SM 312 may be sent over the request response interface 571 instead of the DM request response interface 575. The response transmitted via the DM request response interface 575 indicates whether the shared request is accepted or deferred by the L1 cache 320.

The L1 cache 320 uses the miss data request interface 574 to request the SM 312 to schedule a slot for receiving miss data to specific local register file banks. The SM 312 then sends a specific request over the unified request interface 572 for the L1 cache 320 to actually send the data via the data interface 578. This handshake ensures that the SM 312 will be able to receive the miss data via the data interface 578 and simplifies aspects of the L1 cache 320. A valid mask may be sent by the L1 cache 320 to the SM 312 indicating the portions of the data that are valid. The valid mask may be sent at the same time as the request response or with data values returned on data interface 578. In some embodiments the valid mask is output by the L1 cache 320 on data interface 578 one or more clocks before the data.

The internal status interface 576 provides the SM 312 with a continuous stream of status about the L1 cache 320. The status tells the SM 312 not to send requests likely to use the L1 cache 320 resources that are almost full, such as the pending request table or WDB 530. This reduces the chance of a request from the SM 312 being deferred by the 1 cache 320. The status also indicates to the SM 312 when requests which were deferred and told to back off should be rescheduled. In some embodiments, the L1 cache 320 reports any error that occurs to the SM 312 on an error interface (not shown).

The data interface 577 provides data for store requests (to either the local and global cached storage or the direct mapped memory portion of the SRAM 520) output via the request interface 572 to the L1 cache 320. The return data interface 578 carries the requested data back to the SM 312. Lock status is included as well, if applicable. Data for lanes which are inactive or invalid are zeroed; data for inactive bytes on valid lane is not zeroed. A primary reason for zeroed data is to satisfy the DX10 requirement that loads outside a surface should return 0, but this can also reduce non-determinism when testing.

Figure 6:
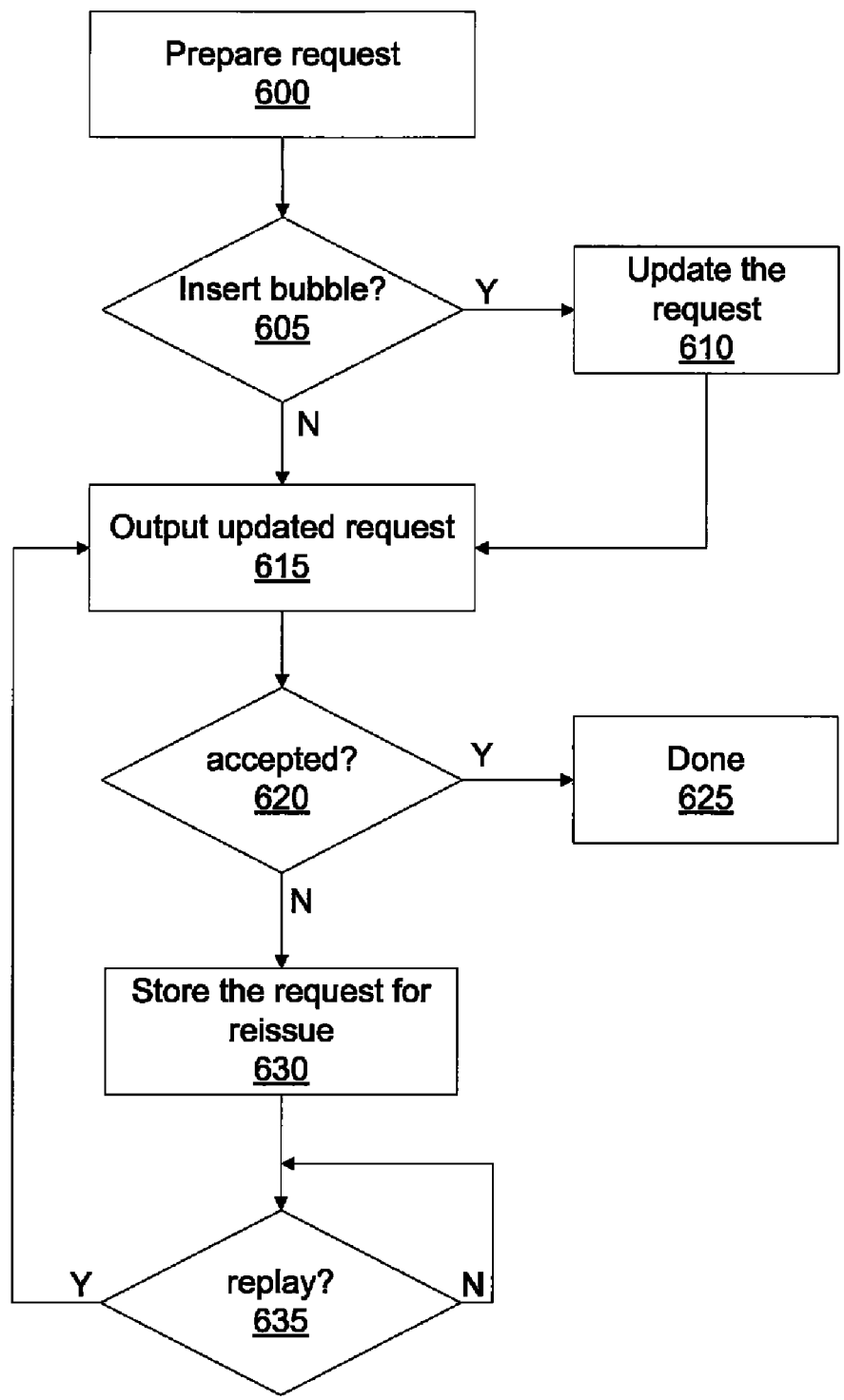
FIG. 6 is a flow diagram of method steps for the L1 cache and SM interface protocol, according to one embodiment of the present invention.

FIG. 6 is a flow diagram of method steps for the L1 cache 320 and SM 312 interface protocol, according to one embodiment of the present invention. Although the method steps are described in conjunction with the systems of FIGS. 1, 2, 3A, 3B, 5A, and 5B, persons skilled in the art will understand that any system configured to perform the method steps, in any order, is within the scope of the inventions. At step 600 the SM 312 prepares a request for output to the L1 cache 320. At step 605 the SM 312 determines whether a bubble should be inserted into the request stream, and, if so, at step 610 the request is updated by inserting a bubble into the request. A read bubble, write bubble, or a read/write bubble may be inserted into the request to produce an updated request. When a read/write bubble is inserted into the request the request is effectively invalidated. Similarly, when a read bubble is inserted into a read request or a write bubble is inserted into a write request, the request is effectively invalidated. At step 615 the SM 312 outputs the updated request to the L1 cache 320. At step 620 the SM 312 determines if the updated request was accepted by the L1 cache 320. The updated request is not considered to be accepted if the updated request is completely rejected or if only a portion of the request is accepted (and the remaining portion is deferred).

If, at step 620 the updated request is accepted, then at step 625 transmission of the updated request is complete. Otherwise, at step 625 the updated request is stored in the request reissue unit 555 to be reissued by the SM 312 at a later time. At step 635 the SM 312 determines if the status provided by the L1 cache 320 indicates that the updated request should be replayed. If the updated request should be replayed, then the SM 312 returns to step 615 to reissue the updated request. Otherwise, the SM 312 repeats step 635.

L1 Cache Arbitration

As previously explained, the L1 cache 320 differs from a conventional data cache that only serves a single external client in each clock cycle, since the L1 cache 320 serves multiple clients, internal and external. The SM 312 and PE 316 are external clients and the data fill 525 is an internal client that presents only write requests. The flush mechanism that writes data back to memory is also an internal client that presents only read requests. Both the SM 312 and the PE 316 use the L1 cache 320 as a temporary buffer to exchange information. Therefore, both clients may issue a request for the L1 cache 320 in the same clock cycle. However, during any given clock cycle the L1 cache 320 can grant access to only a single external client. Therefore, the arbiter 500 determines which client should be granted access when two or more clients present a request in the same clock cycle. The arbiter 500 may use different grant policies and priorities to arbitrate between the multiple clients. As an example, the arbiter 500 may always give preference to requests received from the SM 312, or to requests received from the PE 316, or provide some delay before a request received from the PE 316 stomps requests received from the SM 312, causing the requests from SM 312 to be deferred. The arbitration policy may be programmed to achieve the highest performance.

In one embodiment the arbiter 500 will not arbitrate read request received from the PE 316 until there is space in a 128B holding buffer to receive the read data for output to the PE 316. The arbiter 500 may be configured to give preference to the requests received from the SM 316, because deferral of processing requests received from the SM 316 may substantially decrease overall processing performance. In order to process a request received from the PE 316, the arbiter 500 may output hint information to the SM 312 indicating that the SM 312 should provide a vacant clock (bubble) in the request stream generated by the SM 312. If bubble is not provided after a predetermined number of clocks, then L1 cache 320 defers a SM 312 request and uses the clock to satisfy PE 316 request. In some embodiments, the arbiter 500 requests the bubble from the SM 312 via a bubble count instead of waiting for a bubble to be output by the SM 312 (in the form of a clock cycle without a read, write, or read/write request).

Figure 7A:
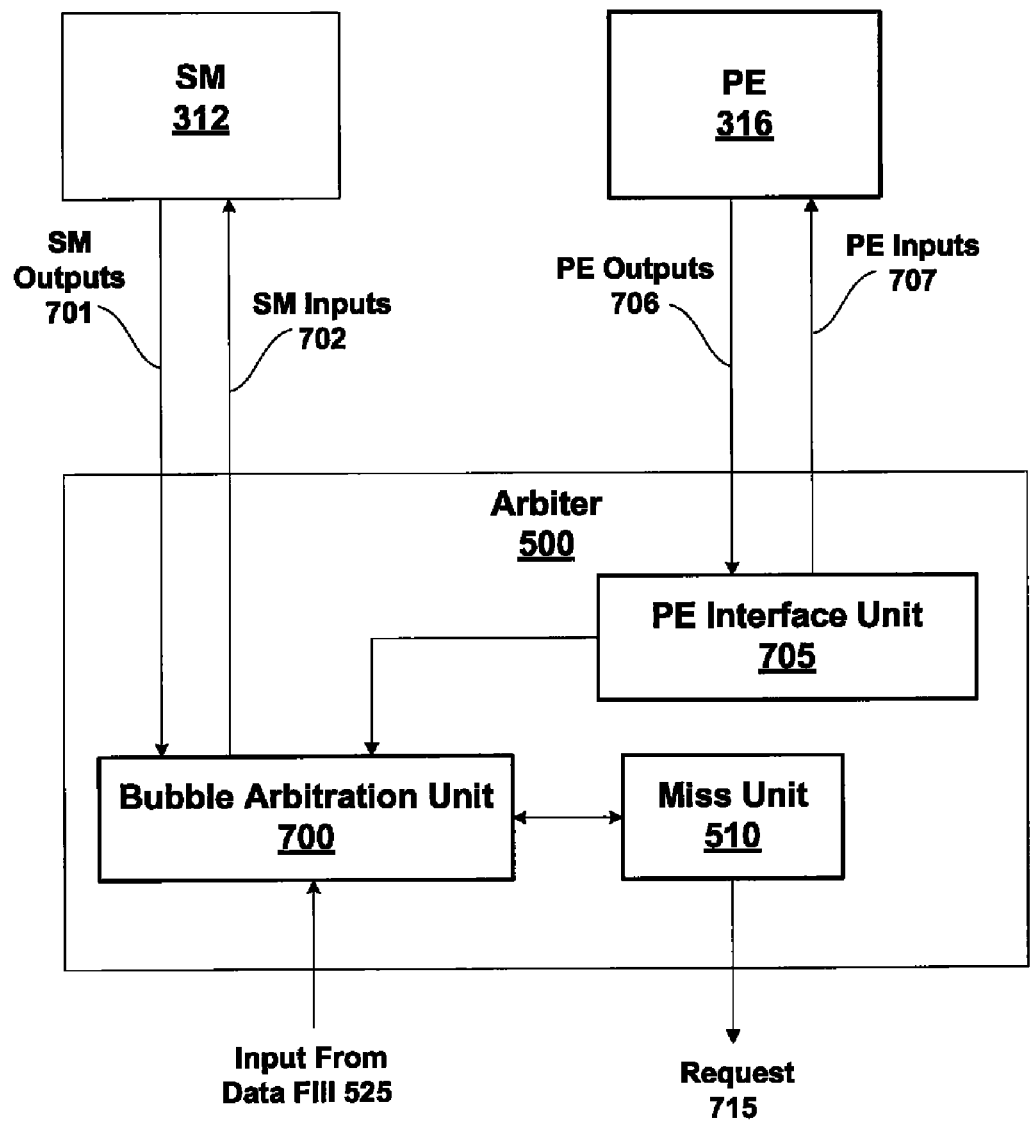
FIG. 7A is a block diagram of the arbiter within the L1 cache, SM, and PE of FIG. 3A, according to one embodiment of the present invention.

FIG. 7A is a block diagram of the arbiter 500 within the L1 cache 320, the SM 312, and the PE 316 of FIG. 3A, according to one embodiment of the present invention. An interface SM outputs 701 includes outputs from the SM 312 to the arbiter 500, e.g., request 572 shown in FIG. 5B. An interface SM inputs 702 includes inputs to the SM 312 from the arbiter 500, e.g., request response 571, DM request response 575, status 576, miss data request 574, and hint 573 shown in FIG. 5B. Requests received by the L1 cache 320 from the SM 312 cannot be stalled, so requests that are not accepted by the arbiter 500 are deferred and resubmitted by the SM 312 at a later time.

An interface PE outputs 706 includes outputs from the PE 316 to the arbiter 500. An interface PE inputs 707 includes inputs to the PE 316 from the arbiter 500. Requests received by the L1 cache 320 from the PE 316 can be stalled by the arbiter 500. The PE 316 outputs a valid request for one or more clock cycles, as needed, until the request is not stalled for one clock cycle by the arbiter 500.

While the PE 316 can access the full width of the RAM 380, the full bandwidth may not be required by the PE 316. Therefore the data interfaces between the PE 316 and L1 cache 320 are reduced to reduce the circuitry area and wiring congestion. Write data received from the PE 316 at a lower width is accumulated and packed to a full width entry by the PE interface unit 705 before the write request is arbitrated and output to the RAM 380 via request 715. Similarly, read data requested by the PE 316 is output from the RAM 380 at the full width and stored in a holding buffer. The read data is then unpacked and sequenced back to the PE 316 at a lower width.

The bubble arbitration unit 700 within the arbiter 500 performs the function of bubble arbitration unit 580, by incrementing and decrementing counts for a specific types of bubbles that are needed to process requests received from the PE 316, data fill 525, and flush mechanism. These counts are passed to the SM 312 via the hint interface 573. The bubble arbitration unit 700 interprets the lack of a request of a certain type or lack of any request from the SM 312 as a bubble. The bubble arbitration unit 700 decrements the count for a bubble type once that type is both seen and successfully used. The miss unit 510 outputs the granted requests via requests 715 and the bubble arbitration unit 700 receives inputs from the miss unit 510 and data fill 525.

Figure 7B:
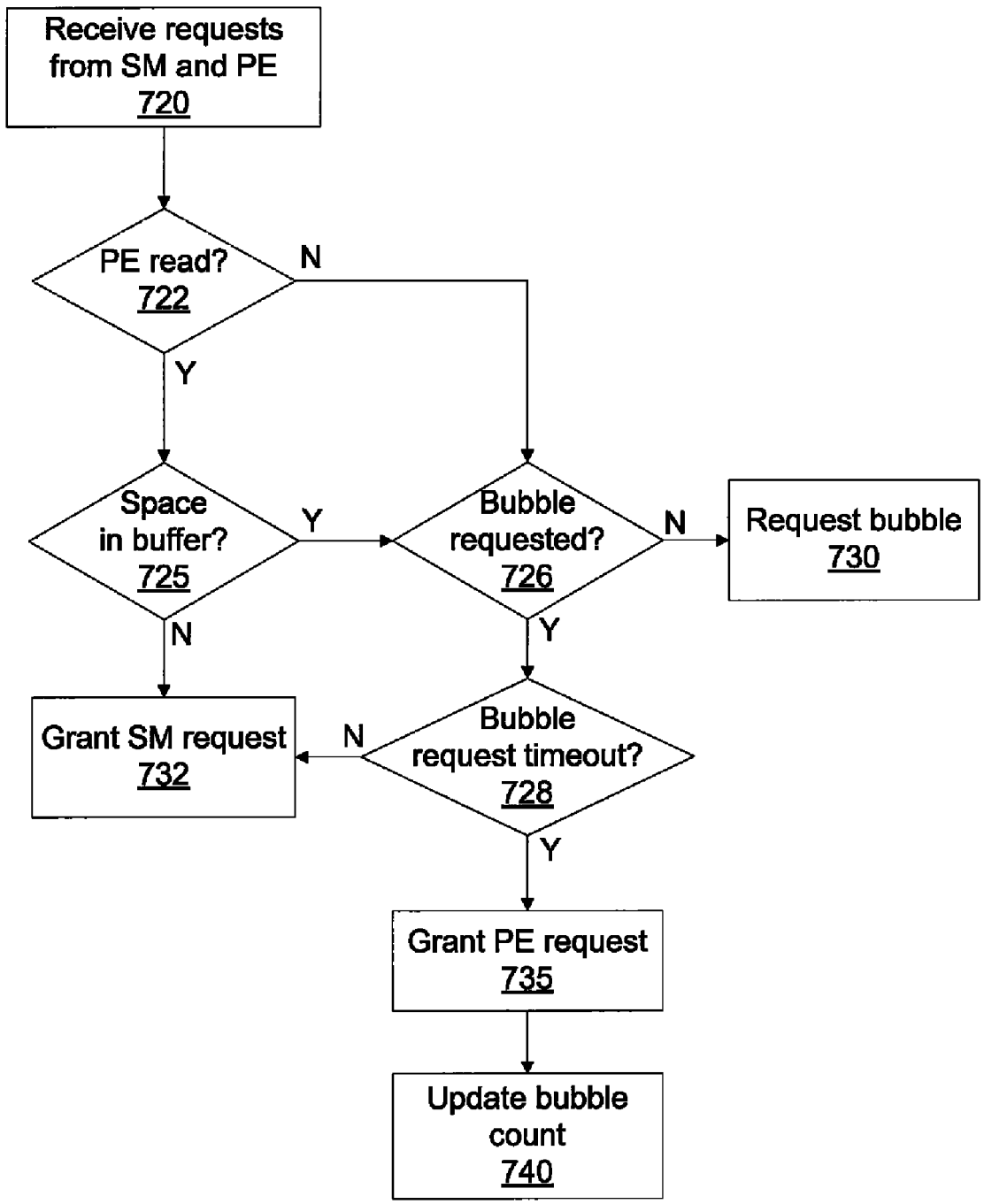
FIG. 7B is a flow diagram of method steps for the L1 cache arbitration, according to one embodiment of the present invention.

FIG. 7B is a flow diagram of method steps for the L1 cache 320 arbitration, according to one embodiment of the present invention. At step 720 the arbiter 500 receives requests from both the SM 312 and the PE 316 in a single clock cycle. At step 722 the arbiter 500 determines if the PE request is a read (load) request, and, if not, the arbiter 500 proceeds directly to step 726. If, at step 722 the arbiter 500 determines that the PE request is a read request, then at step 725 the arbiter 500 determines if there is space in the holding buffer to store the requested data. If there is not space in the holding buffer to store the requested data, then at step 732 the arbiter 500 grants the SM request.

Otherwise, at step 726 the arbiter 500 determines if a bubble has been requested, and, if not, at step 730 the bubble arbitration unit 700 outputs a bubble request to the SM 312. If, at step 726 the arbiter 500 determines that a bubble has been requested, then at step 728 the bubble arbitration unit 700 determines if the bubble request has timed out, meaning that the predetermined number of clock cycles have passed since the bubble request was output to the SM 312. When the bubble request has not timed out, then at step 732 the arbiter 500 grants the SM request. Otherwise, at step 735 the arbiter 500 grants the PE request, deferring the SM request. At step 740 the L1 cache 320 decrements the bubble count based on the type of PE request that was granted. In some embodiments, the number of clock cycles used by the bubble arbitration unit 700 to wait for a bubble of a certain type before timing out and granting a request from PE 316 is configurable.

The arbiter 500 and the bubble arbitration unit 700 also handle requests from sources other than SM 316 and PE 316. For example, the L1 cache 320 receives requests from MMU 328 via data fill 525. Requests from the data fill 525 are non-stallable, so the priorities of requests from data fill 525 are considered for arbitration. In some embodiments, in addition to coalescing miss data into a buffer for larger write accesses to increase the SRAM 380 bandwidth efficiency, the data may be further buffered in temporary storage (not shown). This allows the bubble arbitration unit 700 more time to wait for a write or read/write bubble and grant a request 715 to data fill 525. If, after data fill 525 has made a request to bubble arbitration unit 700 and no grant has been seen by data fill 525, and if the temporary storage for miss data is in danger of running out of available space, the data fill 525 makes an elevated priority request to the bubble arbitration unit 700. This elevated priority request will defer a request from SM 312 and stall a request from PE 316, causing arbiter 500 to grant the request to data fill 525 with all due expediency.

In some embodiments, the arbiter 500 may speculatively issue grants via requests 715. Recall that in some embodiments, multiple physical interfaces may be used to transmit requests from the SM 312 to L1 cache 320 at delayed but fixed latencies with respect to each other. This gives the bubble arbitration unit 700 early information about the request such as load versus store, but does not yet indicate if the request is for the direct mapped storage region or local and global cache region. The bubble arbitration unit 700 may make preliminary and speculative decisions based on this early request information. For example, the bubble arbitration unit 700 may speculatively co-issue grants for data fill 525 with SM 312 store requests. On a following clock cycle, the bubble arbitration unit 700 will know the exact store type. Importantly, global stores that may be uncached do not require the SRAM 380 write port, so a speculative data fill 525 grant is allowed to proceed. Stores to the direct mapped storage region or local cached region do require the SRAM 380 write port, so the bubble arbitration unit 700 will terminate the speculative grant previously issued for data fill 525.

The L1 cache 320 minimizes delays due to arbitration and stalling of the SM 312 requests by providing the hint information to the SM 312. The hint information includes bubble counts that are used by the SM 312 to insert bubbles into the request stream, where a bubble is the absence of a request. The bubbles allow the L1 cache 320 to grant access to another one of the multiple clients, e.g., PE 316 or an internal client, without stalling the SM 312. The L1 cache 320 is able to service multiple clients with diverse latency and bandwidth requirements and may be reconfigured to provide memory spaces for clients executing multiple parallel threads, where the memory spaces each have a different scope.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for arbitrating requests received by a level-one (L1) cache from multiple clients that share the L1 cache, comprising:
   receiving a first request from a first client of the L1 cache in a first clock cycle;
   receiving a second request from a second client of the L1 cache in the first clock cycle;
   incrementing a bubble count that is output to the first client, indicating that an absence of a request from the first client is needed for one clock cycle;
   initializing a bubble request timeout counter;
   granting the first client access to the L1 cache in order to process at least a portion of the first request;
   deferring the processing of the second request; and
   transmitting a first status to the second client indicating that the second request has been deferred and should be reissued.

2. The method of claim 1, further comprising the steps of:
   receiving a third request from the first client of the L1 cache in a second clock cycle;
   receiving the second request from the second client of the L1 cache in the second clock cycle;
   determining that the bubble request timeout has expired;
   granting the second client access to the L1 cache in order to process the second request;
   deferring the processing of the third request; and
   transmitting a second status to the first client indicating that the third request has been deferred and should be reissued.

3. The method of claim 1, further comprising the steps of:
   receiving a third request from the first client of the L1 cache in a second clock cycle;
   receiving the second request from a second client of the L1 cache in the second clock cycle;
   determining that the bubble request timeout has not expired;

incrementing the bubble request timeout counter; and
granting the first client access to the L1 cache in order to process the third request.

4. The method of claim 1, further comprising the steps of:
receiving a third request from a third client for a data fill operation to write data read from memory to the L1 cache in the first clock cycle;
determining that the first request is for a read operation; and
granting the third client access to the L1 cache in order to process the third request.

5. The method of claim 1, further comprising the steps of:
receiving a third request from a third client for a data fill operation to write data read from memory to the L1 cache in the first clock cycle;
determining that the first request is for a read operation and a write operation;
granting the third client access to the L1 cache in order to process the third request; and
deferring the processing of a write portion of the first request; and
transmitting a second status to the first client indicating that the write portion of the first request has been deferred and should be reissued.

6. The method of claim 1, further comprising the steps of:
determining that the second request is a read operation; and
determining that space is available in a buffer within the L1 cache to store data specified by the read operation.

7. The method of claim 1, wherein the second request is a write operation and the bubble count indicates that an absence of a write operation from the first client is needed for one clock cycle.

8. The method of claim 1, further comprising the steps of:
receiving a third request from a third client for a data flush operation to write, in the first clock cycle, data read from the L1 cache to memory;
determining that the first request is for a write operation; and
granting the third client access to the L1 cache in order to process the third request.

9. The method of claim 1, wherein a first region of the L1 cache is configured to provide direct mapped storage that is accessed by the multiple clients to transfer data between the multiple clients.

10. The method of claim 9, wherein a second region of the L1 cache is configured to function as a local cache that supports load and store operations between the multiple clients and a memory.

11. A computer-readable storage medium storing instructions that, when executed by a processor including a level-one (L1) cache and multiple clients, cause the L1 cache to arbitrate between requests received from the multiple clients, by performing the steps of:
receiving a first request from a first client of the L1 cache in a first clock cycle;
receiving a second request from a second client of the L1 cache in the first clock cycle;
incrementing a bubble count that is output to the first client, indicating that an absence of a request from the first client is needed for one clock cycle;
initializing a bubble request timeout counter;
granting the first client access to the L1 cache in order to process at least a portion of the first request;
deferring the processing of the second request; and
transmitting a first status to the second client indicating that the second request has been deferred and should be reissued.

12. A system for arbitrating between multiple clients that share a level-one (L1) cache, the system comprising:
the multiple clients that are coupled to the L1 cache; and
the L1 cache, wherein the L1 cache is configured to:
receive a first request from a first client of the L1 cache in a first clock cycle,
receive a second request from a second client of the L1 cache in the first clock cycle,
increment a bubble count that is output to the first client, indicating that an absence of a request from the first client is needed for one clock cycle,
initialize a bubble request timeout counter,
grant the first client access to the L1 cache in order to process at least a portion of the first request,
defer the processing of the second request, and
transmit a first status to the second client indicating that the second request has been deferred and should be reissued.

13. The system of claim 12, wherein the L1 cache is further configured to:
receive a third request from the first client of the L1 cache in a second clock cycle,
receive the second request from the second client of the L1 cache in the second clock cycle,
determine that the bubble request timeout has expired,
grant the second client access to the L1 cache in order to process the second request,
defer the processing of the third request, and
transmit a second status to the first client indicating that the third request has been deferred and should be reissued.

14. The system of claim 13, wherein the L1 cache is further configured to:
determine that the second request is a read operation, and
determine that space is available in a buffer within the L1 cache to store data specified by the read operation.

15. The system of claim 12, wherein the L1 cache is further configured to:
receive a third request from the first client of the L1 cache in a second clock cycle,
receive the second request from a second client of the L1 cache in the second clock cycle,
determine that the bubble request timeout has not expired,
increment the bubble request timeout counter, and
grant the first client access to the L1 cache in order to process the third request.

16. The system of claim 12, wherein the L1 cache is further configured to:
receive a third request from a third client for a data fill operation to write data read from memory to the L1 cache in the first clock cycle,
determine that the first request is for a read operation, and
grant the third client access to the L1 cache in order to process the third request.

17. The system of claim 12, wherein the L1 cache is further configured to:
receive a third request from a third client for a data fill operation to write data read from memory to the L1 cache in the first clock cycle,
determine that the first request is for a read operation and a write operation,
grant the third client access to the L1 cache in order to process the third request,
defer the processing of a write portion of the first request, and
transmit a second status to the first client indicating that the write portion of the first request has been deferred and should be reissued.

18. The system of claim 12, wherein the second request is a write operation and the bubble count indicates that an absence of a write operation from the first client is needed for one clock cycle.

19. The system of claim 12, wherein the L1 cache is further configured to:
receive a third request from a third client for a data flush operation to write, in the first clock cycle, data read from the L1 cache to memory,
determine that the first request is for a write operation, and
grant the third client access to the L1 cache in order to process the third request.

20. The system of claim 12, wherein a first region of the L1 cache is configured to provide direct mapped storage that is accessed by the multiple clients to transfer data between the multiple clients and a second region of the L1 cache is configured to function as a local cache that supports load and store operations between the multiple clients and a memory.

* * * * *